Patented Mar. 4, 1924.

1,485,701

UNITED STATES PATENT OFFICE.

CHARLES E. NORTH, OF MONTCLAIR, NEW JERSEY, AND GEORGE C. PECK, OF POTSDAM, NEW YORK, ASSIGNORS TO THE MILK OIL CORPORATION, OF WILMINGTON, DELAWARE, A CORPORATION OF DELAWARE.

PROCESS OF EXTRACTING MILK OIL.

No Drawing.   Application filed April 11, 1923.   Serial No. 631,353.

*To all whom it may concern:*

Be it known that we, CHARLES E. NORTH and GEORGE C. PECK, both citizens of the United States of America, residing at Montclair, in the county of Essex and State of New Jersey, and Potsdam, in the county of St. Lawrence and State of New York, respectively, have invented certain new and useful Improvements in Processes of Extracting Milk Oil, of which the following is a full, clear, and exact description.

In processes heretofore practiced for the recovery of oil in a pure state from milk and cream two more prominent difficulties have been encountered; one the breaking of the emulsion so as to secure a complete coalescence of the fat globules; the other the complete separation from the fat of the casein, the other solids not fat and the water.

For purposes of the present case the problems involved in these two steps may be briefly and separately considered notwithstanding the fact that the solution of one assists in certain respects the proper solution of the other.

The emulsion of fat in milk and cream is maintained by the milk serum or what is more commonly known as the skim milk. This is composed of water, casein and albumen in colloidal suspension, sugar and salts in solution, and by its viscosity it holds the milk fat in emulsified form under all natural conditions. This property is not possessed by water alone for a mixture of milk fat and pure water is so unstable that under the influence of gravity alone the two are spontaneously separated into a layer of water and a supernatant layer of fat or oil. The presence in the milk or cream, therefore, of the solids, not fat, and of which the casein forms the chief ingredient, is mainly responsible for the permanency of the emulsion which we know as milk or cream. As above stated this casein in natural sweet milk is in colloidal form, or in other words, it exists in a fine jelly-like suspension, which adds very materially to the viscosity of the milk serum.

It is manifest that could this casein together with the other solids, not fat, be thrown out of the solution or be changed into solid form and withdrawn as such, leaving the serum to consist only of water in which all other solids other than the fat are suspended or precipitated, the serum would lose entirely its property of holding the fat in the form of an emulsion.

One, and generally, the most important step in the breaking of the emulsion is its dilution with water, as this reduces the relative amount of the casein and other non fat solids in proportion to the quantity of dilution water added. In general the amount of fat recovered by the application of heat to such dilutions depends upon the extent to which such dilution is carried.

Separation by centrifugal action contributes materially to the separation of the fat and hence in this process it is desirable and customary to repeatedly dilute and to pass the dilution through an ordinary cream separator, by which means a washed cream is readily obtained in which the stability of the emulsion is very greatly weakened by the removal of the emulsifying forces of the milk serum. By this means the solution of the two problems, and particularly the second named, may be closely approximated but not completed, for the last vestige of casein remaining clings pertinatiously and persistently to the fat globules so that even after many dilutions and centrifugal separations the final product is still an emulsion and has the physical appearance of cream, this being due to the presence of the remanent casein.

The coagulation of the casein in natural milk reduces the viscosity of the milk serum by throwing the colloidal suspension out of its solution, but coagulation in such cases introduces another obstacle to the separation of the fat because of the interference and clogging of the mixture by the solid flakes of coagulum which not only entangle the fat globules and prevent their rising under the influence of gravitation, but quickly close up the spaces and orifices of the centrifugal separator so that the flow of serum and fat through the machine is very quickly arrested.

In all cases where curds or the coagulation above referred to occur in the milk or cream whether naturally as by the souring of the cream, or artificially, as by the addition of coagulating reagents of any kind, some additional steps are necessary to obtain a separation and agglomeration of fat globules and the removal of the curds. Such steps are by whipping or churning the cream and by sedimentation or washing and draining before the fat is sufficiently free to be purified and dehydrated. For these reasons the formation of curds in natural sweet milk and cream by artificial means is to be avoided, if the process of recovering the fat is to be greatly simplified.

We have found, however, that if the skim milk with its casein content be almost wholly washed away from the fat by repeated dilutions and centrifugal separations, artificially promoted coagulation of the casein may be resorted to with great advantage, because the quantity of this ingredient is so relatively insignificant that it does not interfere with the separation of the fat nor tend to clog up the separator. For example, three dilutions and separations of say ten cans of whole milk, if properly carried out, will produce one can of washed cream containing about 35% fat and less than 1% of the casein originally present in the milk. If by means of a curdling reagent this remanent casein be coagulated, the stability of the emulsion is broken to such an extent that the fat may be separated out either by passing the same through any suitable form of filter which will permit the passage of the oil and water but arrest the coagulated particles of casein, or by diluting and heating the mixture until the fat accumulates on the surface when the subnatant dilution water may be drained off. The product in either case may then be passed through an ordinary whey separator to throw off most of the water and any vestige of casein that may remain in the oil, and then passing this concentrated fat through an oil separator or dehydrator to remove the last vestiges of water.

In carrying out this invention we use rennet as the proper curdling reagent for the coagulation of the casein, as this we have found to be the best substance for this purpose as it produces a curd which is much smoother and finer than that produced by acids. The latter clings very persistently to the fat globules while that produced by rennet falls away from them so cleanly that they are completely released from its embrace. Rennet therefore lends itself with peculiar and decided advantage to the process of fat separation, as may be seen by the fact that if a few drops be added to a can of doubly washed cream and the latter permitted to stand for a few moments the fat globules are freed so completely that their separation is spontaneous. So complete is this separation that without filtration, prolonged sedimentation or drainage the cream may be passed at once through a whey separator, preferably with the addition of about four parts of water to one of cream, and a pure clear oil produced in one operation. This oil may then be further dried by means of an oil separator.

No special nor new forms of apparatus are required in carrying out this process. The machines herein described as cream separators, whey separators and oil separators are all well known devices in this art and require no special description.

What we claim is—

1. In the process of recovering oil or fat from milk or cream, the steps herein described of washing the cream separated from the milk, curdling the remanent casein in the washed cream by the addition of rennet and separating out the oil therefrom.

2. In the process of recovering oil or fat from milk and cream, the steps herein described of washing the cream separated from the skim milk, curdling the remanent casein in the washed cream by the addition of rennet, diluting the cream and separating and purifying the oil by centrifugal action.

In testimony whereof we hereto affix our signatures.

CHARLES E. NORTH.
GEORGE C. PECK.